United States Patent [19]
Chikuma

[11] Patent Number: 5,285,508
[45] Date of Patent: Feb. 8, 1994

[54] OPTICAL WAVELENGTH CONVERTER

[75] Inventor: Kiyofumi Chikuma, Tsurugashima, Japan

[73] Assignee: Pioneer Electronic Corporation, Tokyo, Japan

[21] Appl. No.: 4,242

[22] Filed: Jan. 14, 1993

[30] Foreign Application Priority Data

Jan. 14, 1992 [JP] Japan .................................. 4-005056

[51] Int. Cl.⁵ .............................................. G02B 6/10
[52] U.S. Cl. ............................................ 385/30; 385/4; 385/37; 359/326
[58] Field of Search ........................... 385/4–10, 385/27, 30, 37, 42, 122, 129–132; 359/326, 328, 329

[56] References Cited

U.S. PATENT DOCUMENTS

| 5,123,070 | 6/1992 | Bradley ........................... | 385/30 |
| 5,200,939 | 4/1993 | Nishiwaki et al. ............... | 385/37 |

OTHER PUBLICATIONS

"Optical Wavelength Converter Using a LiNbO₃ Waveguide," *Japanese Journal of Applied Physics*, Naoshi Uesugi, vol. 49, No. 12, pp. 1234–1238, 1980.

"Electric Field Tuning of Second-Harmonic Generation in a Three-Dimensional LiNbO₃ Optical Waveguide," *Applied Physics Letter 34 (1)*, Naoshi Uesugi et al, pp. 60–62, Jan. 1, 1979.

*Primary Examiner*—Rodney B. Bovernick
*Assistant Examiner*—John Ngo
*Attorney, Agent, or Firm*—Sughrue, Mion, Zinn, Macpeak & Seas

[57] ABSTRACT

An optical wavelength converter comprises a substrate, a first waveguide formed in the substrate and allowing a fundamental wave to enter therein, and a second waveguide extending parallel to the first waveguide and disposed on the substrate at a predetermined distance spaced from the first waveguide, wherein the second waveguide has refractive index gratings formed and arranged periodically in the extending direction thereof, each refractive index grating having an equivalent refractive index different from that of the second waveguide. The optical wavelength converter is of high conversion efficiency.

7 Claims, 4 Drawing Sheets

4: Air
3: ZnS
6: SiO$_2$
5c: n-type Al$_y$Ga$_{1-y}$As
5a: Active layer
5b: p-type Al$_x$Ga$_{1-x}$As
1a: p-type Al$_z$Ga$_{1-z}$As
1b: p-type GaAs

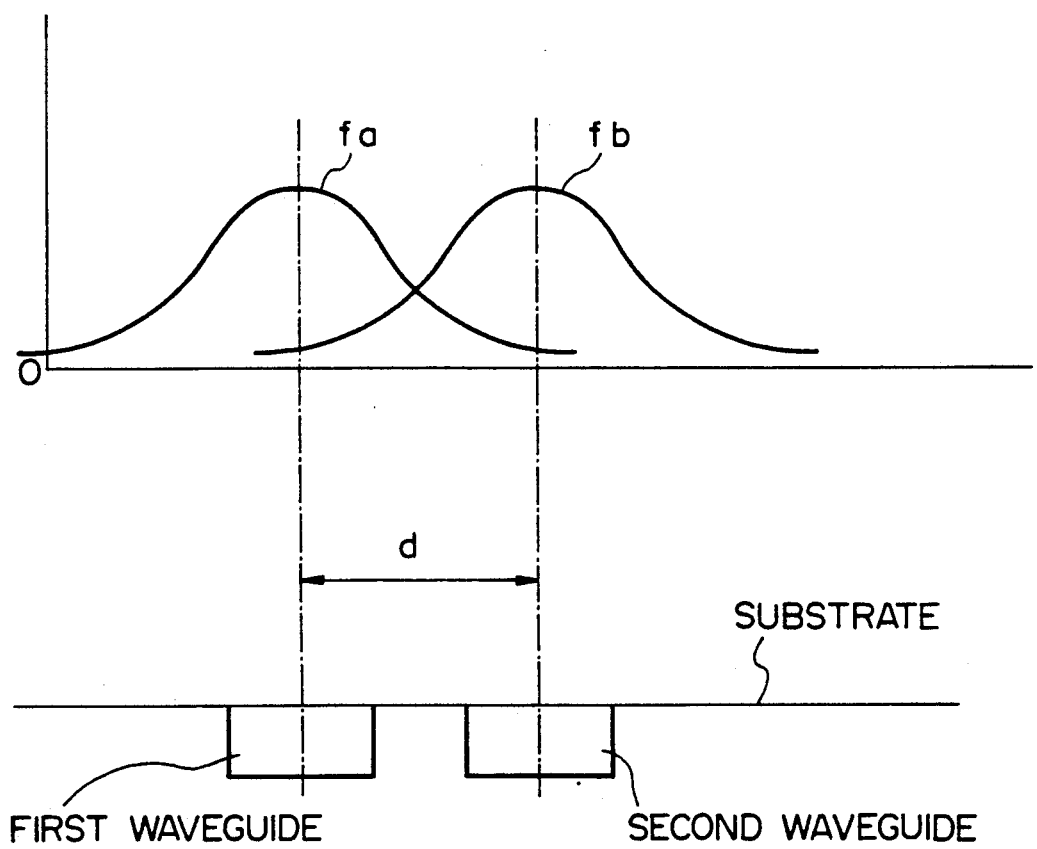

OPTICAL WAVELENGTH CONVERTER

BACKGROUND OF THE INVENTION

1. Field of the Invention

The present invention relates to an optical wavelength converter.

2. Description of the Related Art

There is known a channel type optical wavelength converter having a LiNbO$_3$ layer dispersed with Ti strip layers on a substrate made of yttrium (Uesugi "Optical wavelength converter using a LiNbO$_3$ waveguide" Japanese Journal of Applied Physics Vol. 49, No. 12, PP. 1234-1238, 1980).

In this type optical wavelength converter, it is necessary to conduct phase matching of the fundamental wave and the second harmonic for improving its conversion efficiency. The phase matching is obtained by a method of changing the refractive index in response to changes of temperature, by a method that both the equivalent refractive indexes to a propagating fundamental wave and the second harmonic are coincident in a single waveguide of the optical wavelength converter, or the like. The optical wavelength converter that uses the former technique, in which the phase matching is controlled by the change of temperature, is necessarily provided with a device for controlling temperature adjacent to the converter to avoid the influence of outside temperature changes. The device for controlling temperature utilizes the Peltier effect and keeps the temperature of the optical wavelength converter constant.

However, this device for controlling temperature has a problem that and its response is slow due to the fact that the time constant of the device is large, since the temperature of the device is subject to the outside changes in temperature. Furthermore, this device for controlling temperature requires a large amount of electric current to be driven sufficiently.

SUMMARY OF THE INVENTION

An object of the present invention is to provide an optical wavelength converter of high conversion efficiency.

An optical wavelength converter according to the present invention includes a substrate, a first waveguide formed in said substrate and allowing a fundamental wave to enter therein, and a second waveguide extending parallel to said first waveguide and disposed on the substrate at a predetermined distance spaced from said first waveguide. The second waveguide has refractive index gratings formed and arranged periodically in the extending direction thereof, each refractive index grating having an equivalent refractive index different from that of said second waveguide.

According to the present invention, phase matching between the input fundamental wave in the first waveguide and the output second harmonic in the second waveguide is achieved by the existence of the refractive index gratings each having the equivalent refractive index different from that of said second waveguide and arranged periodically in the longitudinal direction thereof.

BRIEF DESCRIPTION OF THE DRAWINGS

FIG. 4 is a schematic view illustrating both the field distribution functions of the first and second waveguides and the relationship thereof in an embodiment according to the present invention.

DESCRIPTION OF THE PREFERRED EMBODIMENT

Various embodiments of the present invention will be described with reference to the accompanying drawings.

Figure 1:
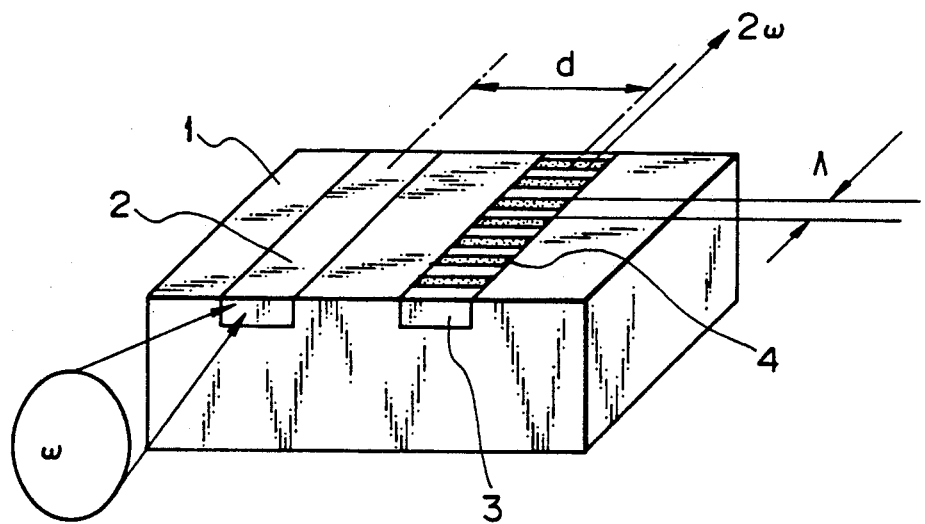
FIG. 1 is a perspective view showing an optical wavelength converter of an embodiment according to the present invention.

As shown in FIG. 1, an optical wavelength converter according to this embodiment has a substrate 1, a first waveguide 2 and a second waveguide 3. Both waveguides are arranged adjacent and parallel to each other at a predetermined distance d. The second waveguide 3 is provided with refractive index gratings 4 which are disposed periodically in the longitudinal direction thereof and each have an equivalent refractive index different from that of the second waveguide 3. The relationship of equivalent refractive indexes of the waveguides 2, 3 is defined by $N_{1(\omega)} \approx N_{2(2\omega)}$, and the cyclic period $\Lambda$ of the refractive index gratings of the second waveguide satisfies $\Lambda \approx 0.5\lambda/N_{2(2\omega)} - N_{2(\omega)})$, wherein $N_{1(\omega)}$ represents the equivalent refractive index of the first waveguide 2 to the fundamental wave (wavelength $=\lambda$, frequency $=\omega$) entering thereto, $N_{2(\omega)}$ represents the equivalent refractive index of the second waveguide 3 to the fundamental wave, and $N_{2(2\omega)}$ represents the equivalent refractive index of the second waveguide 3 to the second harmonic (wavelength $=\lambda/2$, frequency $=2\omega$) output therefrom.

Figure 2A:
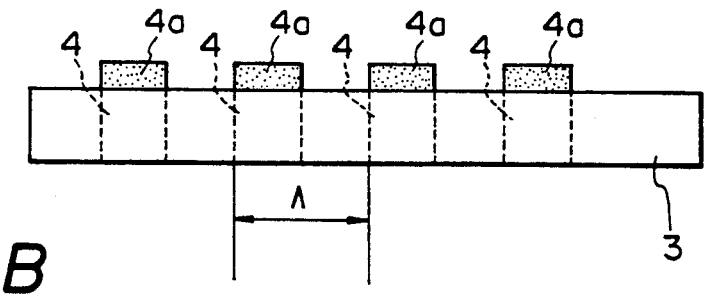
FIG. 2A is a sectional view showing a structure of periodical refractive index gratings formed by periodic thin layers on the second waveguide of the device.
Figure 2B:
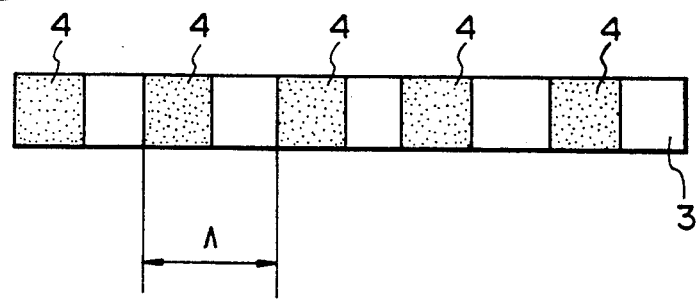
FIG. 2B is a sectional view showing a structure of periodical refractive index gratings formed by a proton exchange method on the second waveguide of the device.

As shown in FIG. 2A, the second waveguide 3 is made of optical glass on which a plurality of periodical SiO$_2$ thin films 4a is formed. Each SiO$_2$ film 4a generates a region 4 the equivalent refractive index of which is different from that of the second waveguide 3. The refractive index gratings 4 are therefore partially formed so that the regions are disposed periodically in the longitudinal direction of the second waveguide 3. Furthermore, as shown in FIG. 2B, the refractive index gratings 4 may be formed in the second waveguide 3 by a proton exchange method. These substrate and waveguides may be made of nonlinear optical material such as LiTaO$_3$, LiNbO$_3$, MgO-LiNbO$_3$.

Figure 2C:
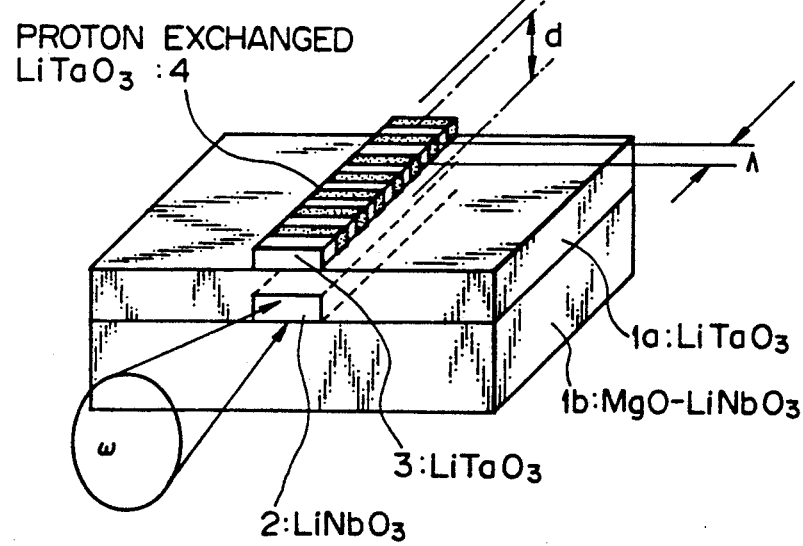
FIG. 2C is a perspective view of a second optical wavelength converter of a further embodiment according to the present invention showing a structure in which a second waveguide with periodical refractive index gratings is superimposed over a first waveguide.

Another construction of the optical wavelength converter is shown in FIG. 2C. This device comprises a substrate formed of a $LiTaO_3$ layer $1a$ laminated on a MgO— $LiNbO_3$ layer $1b$, a first waveguide 2 of $LiNbO_3$ layer formed in the substrate so as to be embedded between both the layers $1a$ and $1b$, and a second waveguide 3 of $LiTaO_3$ layer disposed parallel to the first waveguide 2 in such a manner that the second waveguide is superimposed above the first waveguide and separated by the layer $1a$ at a predetermined distance d therefrom. The refractive index gratings 4 are formed by means of the proton exchange method so as to be periodically disposed in the extending direction of the second waveguide. In this case, each refractive index of the refractive index grating 4 is larger than that of the second waveguide 3. The refractive indexes of the refractive index gratings 4 are substantially the same preferably.

Conditions relating to cyclic period of the refractive index gratings 4 will now be described.

When a pair of three-dimensional waveguides are disposed parallel and adjacent to each other, these waveguides give and take energy therebetween in accordance with an energy reciprocal action. As a result, each propagation constant of the waveguide mode in the waveguide changes in comparison with that of a single waveguide in the same conditions.

On the other hand, when refractive index gratings, each having an equivalent refractive index different from that of the other portions of the waveguide, are periodically disposed in the longitudinal direction of a three-dimension waveguide (namely, the wave propagating in the waveguide is modulated with the periodic change of the refractive index), a constant corresponding to the period is added to an original propagation constant $\beta$ thereof. When such an arrangement of refractive index gratings has a pitch $\Lambda$, its propagation constant of the waveguide mode $\beta$ add after addition of the refractive index gratings is represented by $\beta add = \beta + 2\pi/\Lambda$.

There is further a relationship $\beta = N \cdot 2\pi/\lambda$ wherein $\lambda$ represents a wavelength of a propagating wave in a waveguide, $\beta$ represents the propagation constant and N represents the equivalent refractive index N of the waveguide under the non-absorption conditions.

In view of these conditions, the present invention is understood in such a manner that, when a first three-dimension waveguide is parallel and adjacent to a second three-dimension waveguide, which has periodical refractive index gratings with a pitch or cyclic period $\Lambda$, the first and second conditions are given by the following formulas 2 and 3

$$\beta_{2(2\omega)} - \beta_{2(\omega)} \approx \beta_{2(\omega)} + 2\pi/\Lambda \quad (2)$$

$$\therefore \beta_{2(2\omega)} \approx 2\beta_{2(\omega)} + 2\pi/\Lambda$$

$$\therefore 2\pi/\Lambda \approx \beta_{2(2\omega)} - 2\beta_{2(\omega)} = (2N_{2(2\omega)} - 2N_{2(\omega)}) \cdot 2\pi/\lambda$$

$$\therefore \beta_{2(\omega)} = N_{2(\omega)} \cdot 2\pi/\lambda \text{ and } \beta_{2(2\omega)} = N_{2(2\omega)} \cdot 2\pi/(\lambda/2)$$

$$\therefore \Lambda \approx \lambda/(2N_{2(2\omega)} - 2N_{2(\omega)}) = 0.5\lambda/\{N_{2(2\omega)} - N_{2(\omega)}\} \quad (1)$$

and $$\beta_{1(\omega)} \approx \beta_{2(\omega)} + 2\pi/\Lambda \quad (3)$$

where $\beta_{2(2\omega)}$ represents a propagation constant of the second waveguide to a second harmonic $2\omega$, $\beta_{2(\omega)}$ represents a propagation constant of the second waveguide to a fundamental wave $\omega$, $\beta_{1(\omega)}$ represents a propagation constant of the first waveguide to the fundamental wave $\omega$.

Formula 2 of the former first condition implies that the dispersion of refractive indexes to the fundamental wave and the second harmonic (difference of the propagation constants: $\beta_{2(2\omega)} - \beta_{2(\omega)}$) in the second waveguide is compensated by the refractive index gratings ($\beta_{2(\omega)} + 2\pi/\Lambda$) which are disposed periodically in the longitudinal direction thereof and each of which has an equivalent refractive index different from that of the second waveguide, as shown in FIGS. 2A and 2B. In addition, this first condition is sufficiently effective for phase matching in the usage of only one the second waveguide without the first waveguide. By changing the pitch $\Lambda$ of the refractive index gratings, this first condition will be adapted for waveguides made of any optical nonlinear material.

In a further embodiment, the second waveguide is made of ferroelectric and a structure of quasi-phase matching (QPM) inverting the sign of the nonlinear optical constant is formed as the refractive index gratings as shown in FIG. 2B by the proton exchange method. This device having the first and second waveguides, with the latter having the QPM refractive index gratings, is improved in conversion efficiency. This is because quasi-phase matching is conducted as follows: The output second harmonic changes periodically along its propagation in the waveguide together with maximum and minimum values per the coherence length. Since the QPM refractive index gratings inverting periodically the sign of the nonlinear optical constant per the coherence length, the second harmonic output of the second harmonic increases by the addition of waves without the cancellation thereof. The above mentioned period $\Lambda\chi$ is defined so as to correspond to the coherence length.

Formula 3 of the second condition implies that the propagation constant $\beta_{1(\omega)}$ in the waveguide mode of the fundamental wave propagating in the first waveguide is nearly equal to the propagation constant of the second waveguide to fundamental wave $\beta_{2(\omega)}$ in the waveguide mode of the fundamental wave propagating in the second waveguide and modulated by the refractive index gratings. When this condition is satisfied, the fundamental wave entering the first waveguide supplies energy to the second waveguide due to the strong reciprocal action therebetween. Namely, the first and second waveguides are made of substances selected from optical materials satisfying $N_{1(\omega)} \approx N_{2(2\omega)}$ wherein $N_{1(\omega)}$ represents an equivalent refractive index of the first waveguide to the fundamental wave and $N_{2(2\omega)}$ represents an equivalent refractive index of the second waveguide to the second harmonic.

According to another further embodiment, an optical wavelength conversion device is assembled together with a semiconductor laser device. In this device, the first waveguide 2 shown in FIG. 1 is constructed as a GaAs semiconductor laser. Namely, the first wave guide 2 has a construction of multiple layers each made of semiconductor material. Emission light excited in the first waveguide 2 is a fundamental wave and then the second harmonic is output from the end of the second waveguide 3 with the refractive index gratings. Therefore, Distributed Feed Back light (DFB light) caused by inverted domains does not return back to the first waveguide 1 so that a stable operation is achieved preferably. It is advantageous as an integrated device that the first waveguide 2 is made of GaAs semiconductor, since the light source and the optical wavelength converter are able to form the same substrate.

FIG. 3 shows another embodiment of an optical wavelength conversion device assembled with a semiconductor laser device which comprises a GaAs substrate 1, a first waveguide 5 made of $GaAl_{1-x}As_x$ (x:decimal) semiconductor material and formed in the substrate, a buffer layer 6 formed on the substrate with the first waveguide, and a second waveguide 3 made of a nonlinear semiconductor material such as ZnS which is transparent in the wavelength band of blue color. In this device, refractive index gratings 4 made of ZnSe are formed on the second waveguide 3 so as to satisfy the conditions (1) and (2) above mentioned, which gratings are disposed periodically in the longitudinal direction thereof and each of which has an equivalent refractive index different from that of the second waveguide. Such a construction of the device provides a wavelength converter integrated with a light source that is miniaturized and durable.

Figure 3A:
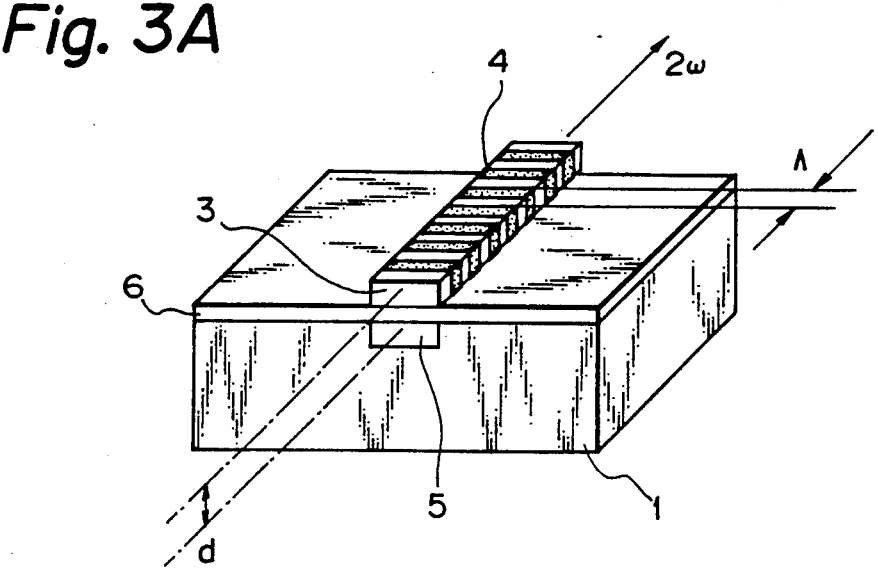
FIG. 3A is a perspective view showing an optical wavelength converter of a further embodiment in which the first waveguide is constructed as a semiconductor laser.
Figure 3B:
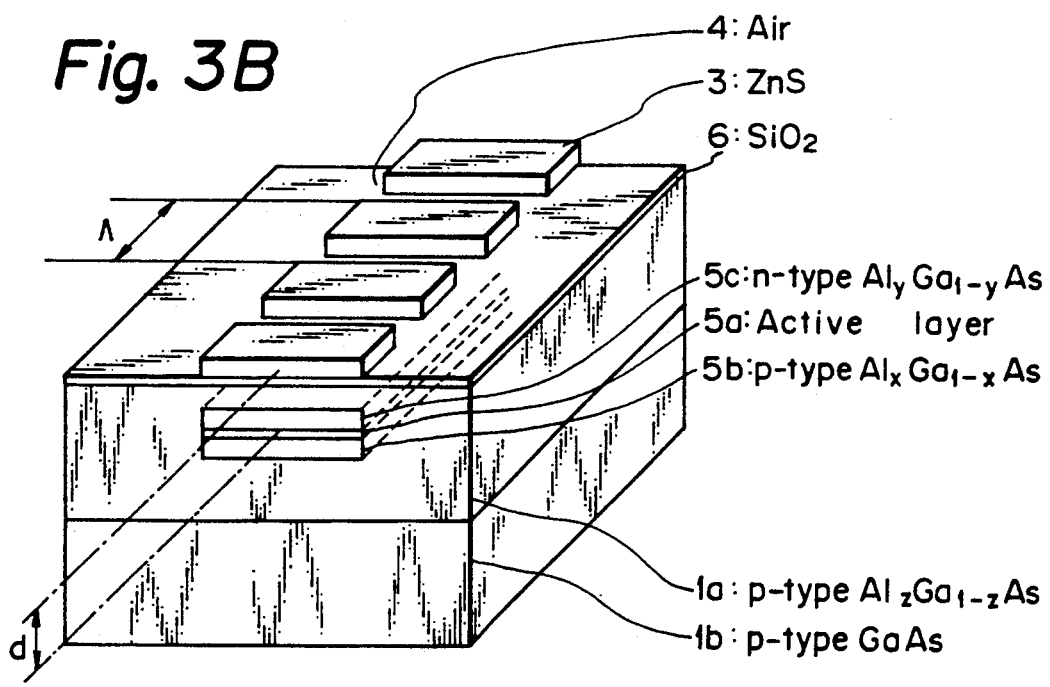
FIG. 3B is a perspective view showing another embodiment integrated with a semiconductor laser similar to that of FIG. 3A.

FIG. 3B shows a further embodiment of an optical wavelength conversion device integrated with a semiconductor laser similar to that of FIG. 3A. The GaAs substrate 1 is constructed with a p-type $Al_zGa_{1-z}As$ layer 1a laminated on a GaAs substrate 1b. The first waveguide 5 comprises an active layer for generating light 5a sandwiched between a p-type $Al_xGa_{1-x}As$ 5b and an n-type $Al_yGa_{1-y}As$ 5b (x,y,z:decimal) and formed so as to be embedded in the substrate. The buffer layer 6 on the substrate is made of $SiO_2$. The second waveguides 3 are made of ZnS respectively and arranged in the form of a line. This line is parallel to the first waveguide 5 in such a manner that the line of second waveguides is superimposed above the first waveguide. The second waveguides are separated by air space 4. Namely, the refractive index gratings 4 are made of air. In this case, each refractive index of the refractive index grating 4 of air is lower than that of the second waveguide 3 of ZnS.

In the integrated semiconductor laser in these devices, since the laser of the first waveguide is used for mainly exciting the second waveguide, the end surface of the first waveguide is preferably covered with a non-reflecting coating, so that the component of return back light or DFB light is prevented. The stable light emission operation is achieved.

On the other hand, the conventional optical wavelength converter is used together with a semiconductor laser device in such a manner that a single waveguide of the converter is separated from the laser device in the same optical axis. But the conventional construction has a problem of emission of DFB light due to its refractive index gratings. For this, it is necessary to insert an expensive isolator between the semiconductor laser and the conventional wavelength converter. In comparison with this, the present embodiment solves these problems of the conventional laser technique.

Furthermore, the superposition of electric field distributions in the fundamental modes of electromagnetic field distributions are caused in response to the distance between the first and second waveguides. This degree of superposition is obtained from the following formula 4 and will be understood by noting FIG. 4.

$$\chi_{ab} = \int \Omega_b \Delta\epsilon \, fafb \, dydx \tag{4}$$

wherein $\chi_{ab}$ represents a degree of superposition, $\Omega_b$ represents an area region of the second waveguide, $\Delta\epsilon$ represents a perturbation reflecting the existence of the second waveguide, fa represents a first field distribution function of the first waveguide and fb represents a second field distribution function of the second waveguide.

An effective resonance is therefore achieved by setting of the predetermined distance d between the first and second waveguides (2,3 and 5,3) shown in FIGS. 1 and 3 so as to satisfy the condition is defined by the following formula 5.

$$|\chi_{ab}| \geq k|N_{1(\omega)} - N_{1(2\omega)}| \tag{5}$$

where k represents $2\pi/\lambda$, $\lambda$ represents a wavelength of the fundamental wave, $N_{1(\omega)}$ and $N_{1(2\omega)}$ represent equivalent refractive indexes to the fundamental wave and second harmonic, respectively.

According to the present invention, an optical wavelength converter of high conversion efficiency is obtained. The phase matching conditions between the first waveguide and second waveguide are relaxed and free from the restriction due to the properties of optical nonlinear materials such as refractive indexes, dispersion etc. The designing of the wavelength converter is therefore facilitated.

What is claimed is:

1. An optical wavelength converter comprising: a substrate, a first waveguide formed in said substrate and allowing a fundamental wave to enter therein, and a second waveguide disposed parallel to said first waveguide at a predetermined distance spaced therefrom, and refractive index gratings formed in said second waveguide and arranged periodically in the extending direction thereof, each refractive index grating having an equivalent refractive index different from that of said second waveguide, wherein a cyclic period of said refractive index gratings $\Lambda$ is given by $$\Lambda \approx 0.5\lambda/(N_{2(2\omega)} - N_{2(\omega)})$$

wherein $\lambda$ represents a wavelength and $\omega$ a frequency of the fundamental wave, $N_{2(\omega)}$ represents an equivalent refractive index of said second waveguide to the fundamental wave, and $N_{2(2\omega)}$ represents an equivalent refractive index of said second waveguide to the second harmonic, and said first and second waveguides made of optical materials satisfying $$N_{1(\omega)} \approx N_{2(2\omega)}$$

wherein $N_{1(\omega)}$ represents an equivalent refractive index of said first wavelength to the fundamental wave.

2. An optical converter according to claim 1, wherein said refractive index gratings are formed in said second waveguide by a proton exchange method.

3. An optical converter according to claim 1, wherein said refractive index gratings are formed by a plurality of periodical $SiO_2$ thin films formed on an optical glass constituting said second waveguide.

4. An optical converter according to claim 1, wherein said first waveguide is constructed of multiple layers each made of semiconductor material so as to form a GaAs semiconductor laser.

5. An optical converter according to claim 1, further comprising a buffer layer interposed between said first waveguide and said second waveguide.

6. An optical converter according to claim 1, wherein said second waveguide is formed as a linear periodic array separated by air spaces, and the air spaces form said refractive index gratings.

7. An optical converter according to claim 1, wherein the predetermined distance between said first waveguide and said second waveguide is determined by:

$$|\chi_{ab}| \geq k|N_{1(1\omega)} - N_{1(2\omega)}|$$

where $\chi_{ab}$ represents a degree of superposition of electric field distributions in fundamental modes for said first and second waveguides, k represents $2\pi/\lambda$, $\lambda$ represents a wavelength of the fundamental wave, and $N_{1(\omega)}$ and $N_{1(2\omega)}$ represent equivalent refractive indexes to the fundamental wave and second harmonic, respectively.

* * * * *